March 26, 1940.  A. R. LOOP  2,195,336
SURFACE ROD BALL-AND-SOCKET JOINT
Filed May 9, 1939   3 Sheets-Sheet 1
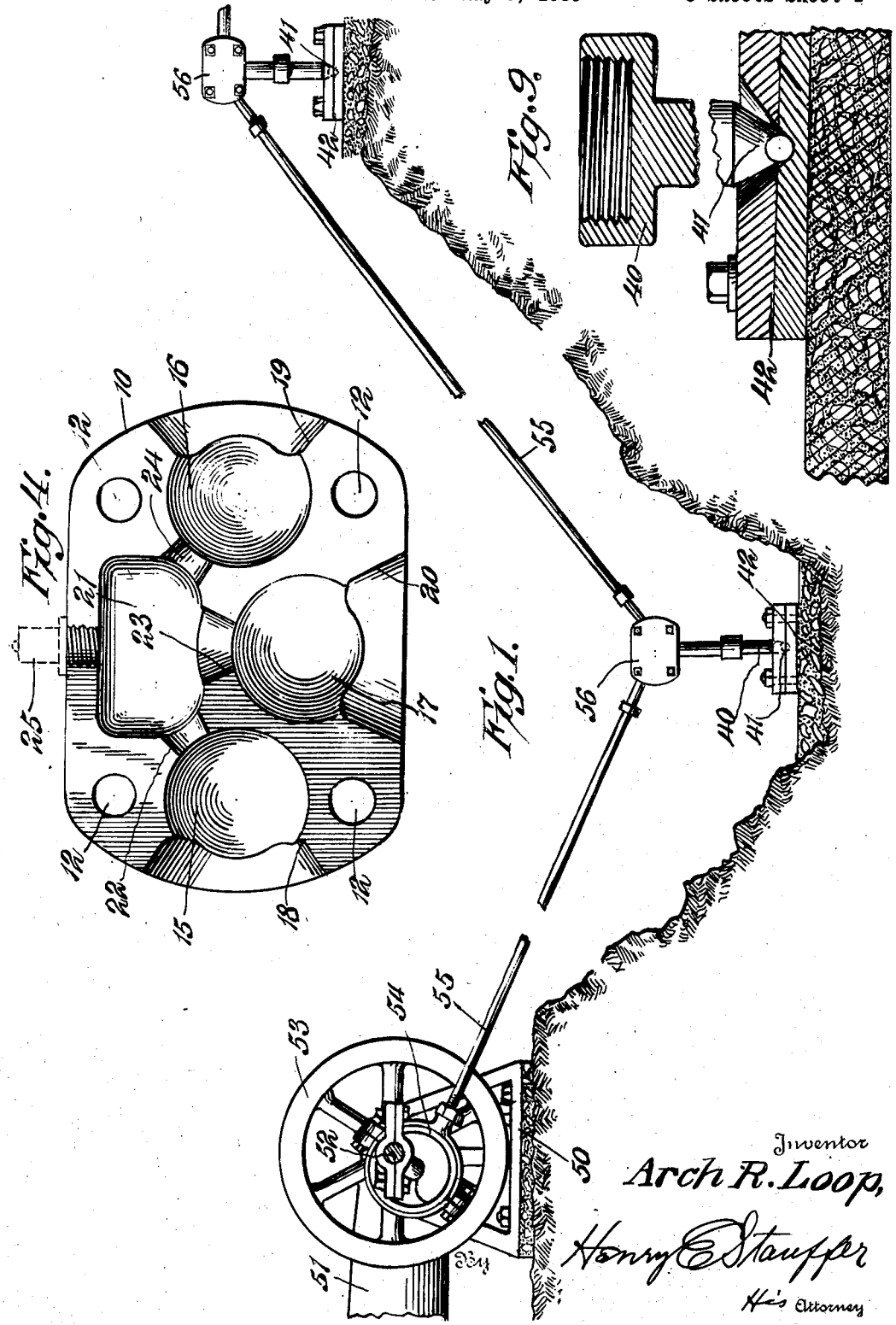
Inventor
Arch R. Loop,
Henry E. Stauffer
His Attorney

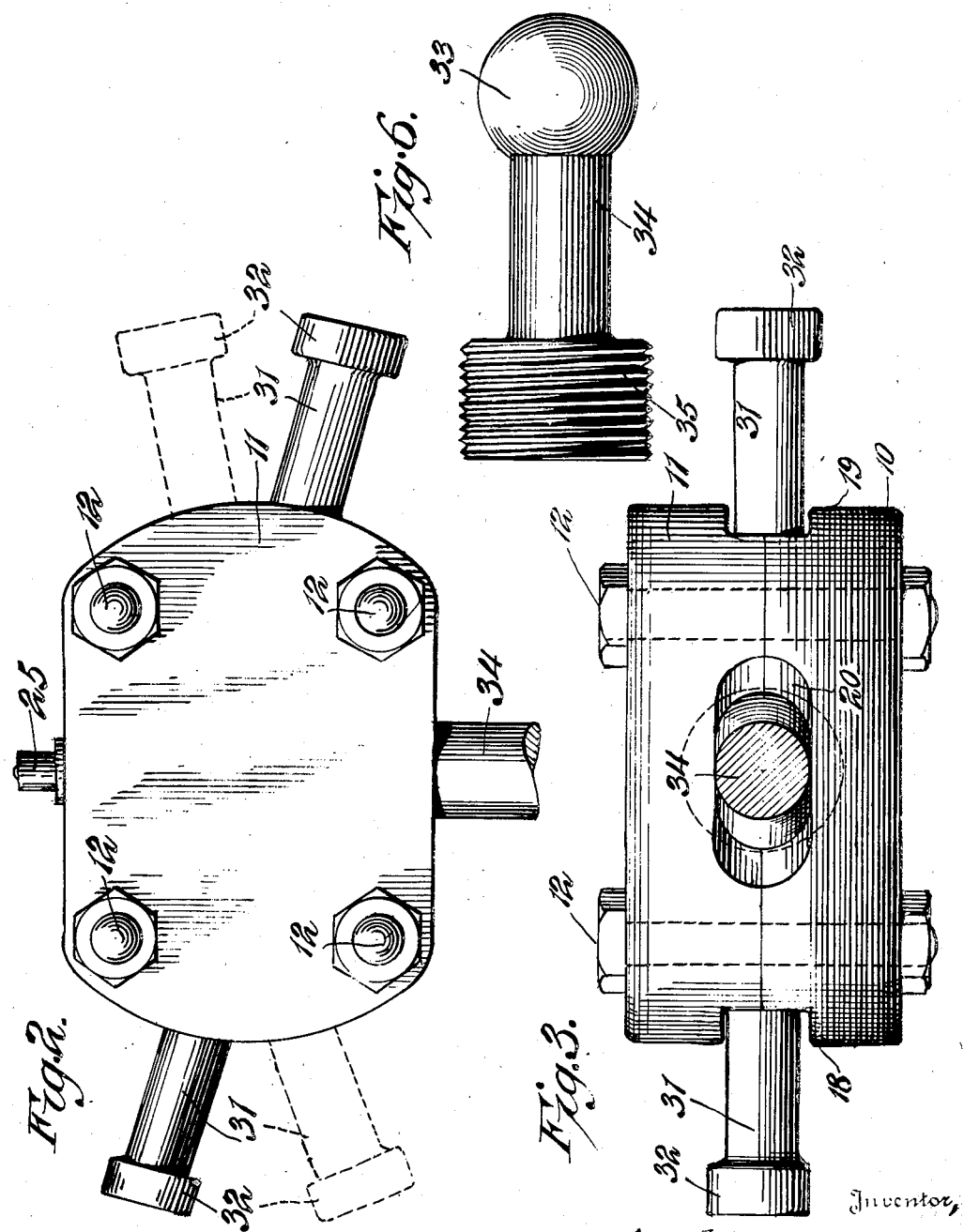

March 26, 1940. A. R. LOOP 2,195,336
SURFACE ROD BALL-AND-SOCKET JOINT
Filed May 9, 1939 3 Sheets-Sheet 3
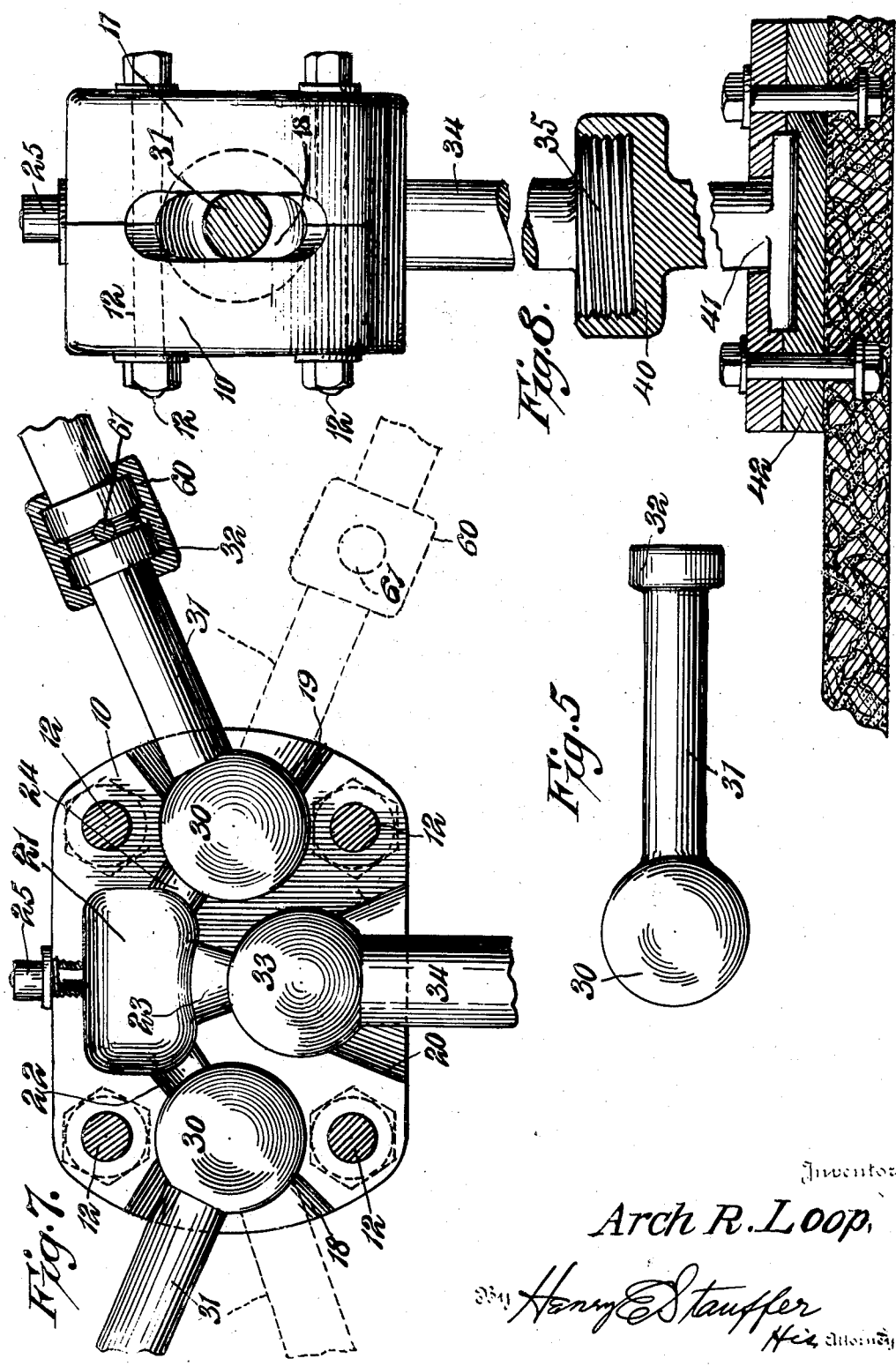
Inventor
Arch R. Loop,
by Henry E. Stauffer
His Attorney Patented Mar. 26, 1940

2,195,336

UNITED STATES PATENT OFFICE 2,195,336

SURFACE ROD BALL-AND-SOCKET JOINT

Arch R. Loop, Eldred, Pa., assignor to Joseph P. Willson, Smethport, Pa.

Application May 9, 1939, Serial No. 272,695

5 Claims. (Cl. 287—12)

This invention is in connectors, or what are hereafter termed surface rod ball-and-socket joints, for use in transmitting power. While these joints are of general application, they are designed particularly for use in oil well pump lines.

In oil fields in which the wells must be pumped, it is common practice to locate a power plant at some convenient and central point, and to operate the pumps at the individual wells by power transmitted from the central plant. Generally, the rotating motion of the power plant is changed to a reciprocating movement, and this movement transmitted through rods, known as surface rods, to the various pumps. Since the distance from the power plant to the well may be as much as 1000 or 1500 feet, or more, it is necessary to utilize many short rods connected in any suitable manner, rather than one long rod; and it is essential that these rods be within easy reach of the ground, in order that they may be readily repaired and serviced. Where the ground is rough, many supports may be necessary in order to keep the line close to the ground. This invention is particularly applicable to such situations, for my devices are readily installed, and the same construction can be used in the valley and on the hill; thus, the joints can be all alike, and be used wherever a change of direction makes a joint necessary or useful.

Fig. 1 is a sectional view of a typical hill and valley terrain, illustrating the invention in use.

Fig. 2 is a side elevation of the ball and socket joint, as it appears in commerce.

Fig. 3 is a bottom view of the structure shown in Fig. 2.

Fig. 4 is a view of one of the two identical casing sections.

Fig. 5 is a detached view of one of the two identical ball members.

Fig. 6 is a detached view of the third ball member.

Fig. 7 is an internal view of the joint, one of the casing sections being removed, showing the several ball members in position.

Fig. 8 is an end view of the joint, with both parts of the casing in position, and showing also the supporting shaft and base therefor.

Fig. 9 is a section of the base for the supporting shaft, taken at right angles to the position in which this element is shown in Fig. 8.

Referring to the accompanying drawings, it will be observed that the coupling casing is made of companion halves 10 and 11, secured together by some suitable means, as by bolts 12, either directly, or with an intervening gasket, as preferred. The parts 10 and 11 are identical except when, as described below, it is desirable to vary the size of some individual member for some special purpose. Fig. 4 shows the interior construction of the casing. Each half contains hemispherical depressions, three in this instance; two of these, 15 and 16, one at either end, are shown as identical, but this is not essential, and they may differ in size; while the third, 17, is in one side of the casing, and may be of any desired size, although it is here shown the same size as 15 and 16.

The recess or socket 15 has opening thereinto an angular groove or depression 18, and the recess or socket 16 is provided with a similar groove or depression 19. In the same way, the lower recess 17 is provided with a depression 20. These three depressions 18, 19 and 20, are so formed that when the halves of the casing are placed together, the depressions constitute slots extending from the outside of the casing to the sockets 15, 16 and 17. These slots are guides for the stems of the ball members, and are of a width just sufficient for the shanks of the ball members to move freely therein. One of these guides is shown in Fig. 8. The lengths of these slots may vary, but they must be sufficiently long for the shanks to shift therein the distance required by the angular motion which the coupling is intended to have.

The companion casing members also have each a recess 21 which, when the members are secured together, form a grease receptacle. This in turn communicates with each of the several sockets 15, 16 and 17, by suitable openings or channels 22, 23 and 24, by which lubrication is provided for the respective sockets. A grease or oil fitting is shown at 25, and this communicates with the chamber 21, so that the latter may be filled with lubricant.

In socket 15 is a ball 30, having a shank 31 with an annular enlargement 32 on the end thereof. The ball fits in the socket snugly but easily, and the shank is of a size to move freely, but without substantial lateral movement, in slot 18. The socket 16, at the other end of the casing, has therein a similar ball 30, likewise having a shank 31, and a similar enlargement 32 for coupling to the line rod. This ball rests freely in the socket 16, and the shank 31 moves freely in the slot 19. Similarly, a ball 33 rests in the socket 17, while the shank 34 thereof is adapted to move freely in the slot 20. The lower end of the shank of this last mentioned ball, as here shown, is larger than the shanks of the other balls, and is threaded for connection to its support, as will be described below. As here shown, the ball 33 is about the same size as the balls 30, although the shank 34 is somewhat heavier than the shanks 31. These are matters of design; sizes of the parts are not of the essence of the invention, and will be varied as needs require.

In Fig. 7, the balls are all shown in position, with their shanks extending through their respective slots; thus, the left hand ball 30 is shown in its recess 15, with its shank 31 in the slot 18; the right hand ball 30 rests in its socket 16, with its shank 31 extending through its slot 19; and the supporting ball 33 lies in its socket 17, with its shank 34 in the slot 20. The lower end connection 35 of shank 34 is not shown in Fig. 7, but appears in Fig. 8.

The shank 34 of the ball 33 has its lower end threaded, as shown in Fig. 6. The threaded end 35 is secured in a coupling 40, which in turn is mounted at 41 so that it may oscillate in the line of movement of the rods, but is fixed against transverse movement. The mounting 41 is shown anchored in a foundation plate 42; but of course any suitable mounting may be used.

In Fig. 1, the application of the invention to a typical hill and valley country is shown. A central power plant is illustrated at the left hand end of the figure. Here, mounted on a suitable base 50 is an engine 51, having a main shaft 52, a fly wheel 53, and one or more eccentrics 54. Each eccentric operates a rod 55.

The ends of the shanks 31 may be attached to the surface rods 55 in any preferred manner; but are here shown (Fig. 7) coupled thereto by clamps 60, made in halves and secured together by bolts 61.

Assuming the eccentric to be moving to the right, the rods 55 also are moved to the right, and the ball and socket couplings, here shown generally as 56, are likewise moved to the right around the pivots 41 of their respective stands 40. There may be many of these couplings and stands between the engine and the well, but they all move to the right in unison. As the eccentric 54 passes the point of maximum throw, the rods 55 and couplings 56 all move to the left. This continues until the maximum movement in this direction is completed, whereupon the action is repeated. Thus, the rods 55 move back and forth, and the couplings 56 oscillate on their stands 40 as long as the pumping continues.

The slots 18, 19 and 20 permit oscillation of the couplings in the plane in which these slots are arranged. This usually, but not necessarily, will be in the vertical plane. The extent to which the parts may oscillate will depend, within reasonable limits, upon the length of these slots 18, 19 and 20. They should be as long as the most difficult territory will require.

This ball and socket joint constitutes a particularly good construction for transmitting the movement of the eccentric to the pumps to be operated. The balls and sockets permit free and efficient movement in the desired direction. The end slots in the casing, here shown as vertical, will prevent any substantial rotation of the joint around a vertical axis; and the slot 20, which is parallel to the line of movement, will, in cooperation with its ball 33 and shank 34, prevent substantial rotation of the joint or coupling around a horizontal axis.

One type of coupling satisfies all requirements. It may be mounted in a valley or on an elevation; and the stems of the balls will all move freely in the direction of their respective slots, but at the same time, the joint as a whole can neither rotate nor move laterally to any substantial extent.

The number of couplings necessary in any given line will depend upon the distance between the central power plant and the wells, and also on the character of the ground surface. If the territory to be crossed is much broken, that is, if it has many hills and valleys, the number of couplings will necessarily be greater than in a more level country.

The construction is rigid, simple, easily kept in order, and may be readily set up and taken down.

I claim:

1. In a surface rod coupling, the combination of a casing having therein two or more sockets substantially in line and at least one other at an angle thereto all arranged in substantially the same plane and guideways in the casing communicating one with each socket and all elongated in the plane in which the sockets are positioned, and balls one for each socket each having a stem which projects through and is movable within its guideway, so that the casing and ball stems may move with respect to each other in the plane of the guideways.

2. In a surface rod coupling, the combination of a casing comprising duplicate halves each having therein two or more hemispherical sockets substantially in line and at least one other such socket at an angle to the others all arranged in substantially the same plane and guideways one half in each half of the casing communicating one with each socket and all elongated in the plane in which the sockets are positioned, and balls one for each of the first mentioned sockets and each having a stem which projects through and is movable laterally within its guideway, so that the casing and ball stems may move with respect to each other in the plane of the guideways, and a ball in the socket which lies at an angle to the others and having a stem which passes through and is movable in its guideway, and means for supporting the coupling.

3. As an article of manufacture, a casing section comprising an elongated body having hemispherical ball sockets therein one at either end thereof, a recess therein for each hemispherical socket between the socket and the outer surface of the casing section which recess is elongated on the outside and extends into the socket, and another hemispherical socket in substantially the same plane as the others and a recess similar to the other recesses communicating with this hemispherical socket.

4. As an article of manufacture, a casing section comprising an elongated body having hemispherical ball sockets therein one at either end thereof, a recess therein for each hemispherical socket between the socket and the outer surface of the casing section which recess is elongated on the outside and extends into the socket, and another hemispherical socket in substantially the same plane as the others, and a recess similar to the other recesses communicating with this hemispherical socket, and a grease recess and channels therefrom to the hemispherical ball sockets.

5. In a surface rod coupling, the combination of a casing having therein sockets one at either end thereof and another at one side thereof all arranged in substantially the same plane and having guideways one for each socket also all lying in substantially the same plane, and balls one for each socket each having a stem which projects through and is movable in its guideway in the direction of the length thereof, a stand for the ball and stem which is in the side of the coupling, and a support on which the stand is pivotally mounted for movement in the plane of the guides.

ARCH R. LOOP.